(12) United States Patent
Niska et al.

(10) Patent No.: US 8,526,958 B2
(45) Date of Patent: Sep. 3, 2013

(54) METHOD AND SYSTEM FOR IMPROVED HANDOVER OF MOBILE STATIONS TO UNLICENSED MOBILE ACCESS NETWORKS

(75) Inventors: Hakan Niska, Linkoping (SE); Tomas Nylander, Varmdo (SE); Jari Tapio Vikberg, Jarna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1609 days.

(21) Appl. No.: 11/721,063

(22) PCT Filed: Dec. 8, 2004

(86) PCT No.: PCT/IB2004/004040
§ 371 (c)(1),
(2), (4) Date: Jun. 7, 2007

(87) PCT Pub. No.: WO2006/061670
PCT Pub. Date: Jun. 15, 2006

(65) Prior Publication Data
US 2009/0275332 A1    Nov. 5, 2009

(51) Int. Cl.
*H04W 36/00* (2009.01)
*H04W 4/00* (2009.01)
(52) U.S. Cl.
USPC ........ 455/444; 455/435.1; 455/436; 370/331; 370/338

(58) Field of Classification Search
USPC .............. 455/444, 435.1, 436; 370/331, 338
See application file for complete search history.

(56) References Cited

U.S. PATENT DOCUMENTS

| 2004/0116120 A1 | 6/2004 | Gallagher et al. |
| 2005/0148368 A1* | 7/2005 | Scheinert et al. ............. 455/561 |
| 2005/0186948 A1* | 8/2005 | Gallagher et al. ......... 455/414.1 |

FOREIGN PATENT DOCUMENTS

EP    1 427 236 A1    6/2004

* cited by examiner

*Primary Examiner* — Ariel Balaoing (57) ABSTRACT

A method and system for handover of a mobile station (MS) to an unlicensed mobile access network controller (UNC) in an unlicensed mobile access network (UMAN). In one embodiment, the MS sends an unlicensed mobile access (UMA) radio resource (URR) Registration Request message to the UNC with one or more location identifiers for the MS. The location identifiers may include a GSM Cell Global Identity, an access point (AP) Radio Identity, a set of GPS coordinates, or an AP location. The UNC selects absolute radio frequency channel numbers (ARFCN) and base station identity codes (BSIC) values from a table based on the location identifiers and returns them to the MS in a URR Registration Accept message.

12 Claims, 7 Drawing Sheets

METHOD AND SYSTEM FOR IMPROVED HANDOVER OF MOBILE STATIONS TO UNLICENSED MOBILE ACCESS NETWORKS

FIELD OF INVENTION

The present invention relates in general to the field of mobile communications and, more particularly, to a method and system for improved handover of mobile stations to unlicensed mobile access networks.

BACKGROUND ART

In any mobile communication system, such as a Global System for Mobile communications (GSM) network, active calls conducted between a mobile station (MS) and a base station need to be handed over to a different base station as the mobile station moves between different coverage areas, or cells. Depending on how each cell is defined, handover may require the active call to be re-routed simply through a different base station transceiver (BTS), through a different base station controller (BSC) or through a different mobile services switching center (MSC). Handover may also be necessary when capacity problems are met in any one cell.

Handover necessitates a certain amount of operation and maintenance activities on installation of a system, such as defining neighboring cells, as well as the BSC and MSC that controls the cell, defining which cell frequencies should be measured and what threshold value to use to initiate handover. In a conventional GSM network the BSC sends a MS a list of predetermined frequencies to be measured. Two lists may be sent out, a first list being used for idle mode, such as when the MS is roaming, and a second used for active mode when a call is ongoing. This second list defines which frequencies the MS should measure and report back on. These lists contain a set of values that refer to absolute radio frequency channel numbers (ARFCN) of neighboring cells. In addition to these frequency channel numbers, the BSC also knows base station identity codes (BSIC) of all neighbouring cells. The MS measures the frequencies defined by these channel numbers and reports these measurements to the BSC. In practice, the MS will report on only the six best measurement values and only for those cell frequencies with which the MS can synchronize and consequently receive a BSIC. The measurement report sent back to the BSC by the MS includes a reference to the ARFCN, the BSIC and an indication of the received downlink signal strength. In fact the report does not specify the exact ARFCN but rather refers to the position this number occupied in the measurement list. On the basis of this report, the BSC decides whether handover is necessary and to which cell. The initiation of handover is performed according to the standard GSM mechanism for each vendor. Specifically, a message is sent by the base station controller to the MSC connected to the BSC indicating that handover is required. This message contains a cell identifier, encompassed in a cell global identity (CGI), which defines the mobile country code, mobile network code, location area code and cell identifier for the cell to which handover is requested. The CGI is fetched by the BSC from a list using the BSIC and ARFCN obtained for the cell. With this CGI the MSC is able to determine which other MSC handles the cell defined by the CGI value.

Recently proposals have been made to extend conventional cellular networks by including access networks that utilize a low power unlicensed-radio interface to communicate with MSs. The unlicensed mobile access (UMA) networks (UMANs) are designed to be used together with the core elements of a standard public mobile network and consist essentially of plug-in low-power unlicensed radio transceivers, or access points (AP), each AP designed to establish an unlicensed radio link with a MS and a controller or interface node connecting the unlicensed radio transceivers with the mobile core network. Suitable unlicensed-radio formats include digital enhanced cordless telecommunications (DECT), wireless local area network (WLAN) and Bluetooth. An adapted mobile handset capable of operating over both the standard air interface (e.g., the Um interface) and the unlicensed-radio interface means that the subscriber requires only one phone for all environments. The UMA network is constructed so that the core elements, such as the MSCs, of the public mobile network views the interface node as a conventional BSC. Such a UMA network and the MS for use with this UMA network are described in various UMA standard specifications and other implementations, such as European patent application No. EP-A-1 207 708. The content of this application is incorporated herein by reference.

The low power and resultant low range of the unlicensed-radio interface means that several such UMA networks may be provided in relatively close proximity, for example one access network per floor of an office building or in a private home. The connection between the unlicensed-radio transceivers and the associated unlicensed network controller (UNC) is provided by a fixed broadband network. Preferably, communication over this network uses the internet protocol (IP), which greatly facilitates the installation of the UMA network, permitting a subscriber to plug-in an unlicensed-radio transceiver or in his own home and consequently install an unlicensed-radio access point (AP) himself. However, the flexibility of such UMA networks also presents difficulties. Since an access point can be freely installed and moved by a subscriber to a separate city, state or even country, yet still connect to its original UNC, the exact location of the AP cannot always be tracked by the core network. Massive cell planning by the operator is required for the core network to track the location of the AP. This imposes huge demands on the operation and maintenance activities required for handover to and from the UMA network, as neighboring cells may change frequently. Also billing restraints in some areas may require the re-assignment of a relocated AP to a more appropriate UNC, particularly if revenue from calls originating from a specific AP must be accounted for in a specific region of a country. In view of the small size of the AP to an UMA network, it would not be cost effective for operators to configure each AP separately. However, it is also undesirable to leave the task of configuration to the subscriber as such a solution would be error prone and consequently unreliable. In addition, suppliers would not wish to configure AP differently depending on where these are ultimately to be installed.

Moreover, current UMA specifications presume that a single ARFCN value and a single BSIC value are defined for the UNC. This creates some limitations in the current procedures for the handover of a MS into UMAN that arise in some scenarios where ARFCN's are a scarce resource. For example, such scenarios occur when one UNC is serving multiple MSC Serving Areas and the same ARFCN value cannot be used in the BSC's and cells belonging to these MSC Service Areas. As illustrated in the logical diagram of FIG. 4, MSC-1 400 and MSC-2 404 are both connected to UNC 402. MSC-1 400 only has one free ARFCN value X available in the Cells belonging to MSC-1 400. Similarly, MSC-2 404 only has one free ARFCN value Y available in the Cells belonging to MSC-2 404. As a result, UNC 402 is not able to indicate different ARFCN values to MSs registering from Service Areas covered by MSC-1 400 and MSC-2 404. Accordingly, handover of the MS to the UNC 402 is not possible in this scenario.

SUMMARY OF THE INVENTION

The present invention provides a method and system for improved handover of mobile stations (MS) to unlicensed mobile access networks (UMAN) that allows the UMAN operator to define multiple absolute radio frequency channel number (ARFCN) and base station identity code (BSIC) values for one unlicensed network controller (UNC). The MS includes one or more current location identifiers, such as GSM Cell Global Identity (GSM CGI), unlicensed-radio access point (AP) Radio Identity (AP-ID), Global Positioning System (GPS) coordinates or AP location, in the registration request to the UNC. The UNC uses the one or more location identifiers to select different ARFCN and BSIC values for the MS depending on the current MSC Service Area or Location Area or even Cell. As a result, the present invention gives the network operator more flexibility when enabling handover into UMAN in the network. In some cases, handover into UMAN would not be possible without the present invention.

More specifically, the present invention provides several methods for handover of a mobile station (MS) to an unlicensed mobile access network controller (UNC) in an unlicensed mobile access network (UMAN). A first method sends a URR Registration Request message containing one or more location identifiers for the MS to the UNC, selects UNC ARFCN and BSIC values for the MS based on the one or more location identifiers for the MS, and sends a URR Registration Accept message containing the selected ARFCN and BSIC values for the MS to the MS. A second method sends a URR Registration Request message containing one or more location identifiers for the MS to the UNC and receives a URR Registration Accept message containing the selected ARFCN and BSIC values for the MS from the UNC. A third method receives a URR Registration Request message containing one or more location identifiers for the MS from the MS, selects UNC ARFCN and BSIC values for the MS based on the one or more location identifiers for the MS, and sends a URR Registration Accept message containing the selected ARFCN and BSIC values for the MS to the MS.

The present invention also provides a method for creating an ARFCN and BSIC Lookup Table for use by an unlicensed mobile access network controller (UNC) to handover a mobile station (MS) in an unlicensed mobile access network (UMAN) by determining ARFCN and BSIC values allocated to the UNC and creating the ARFCN and BSIC Lookup Table corresponding to one or more location identifiers.

Moreover, the present invention provides a system in an unlicensed mobile access network (UMAN) that includes a mobile station (MS) having one or more location identifiers, an unlicensed mobile access network controller (UNC) in communication with the MS, and an ARFCN and BSIC Lookup Table accessible by the UNC for selecting UNC ARFCN and BSIC values for the MS based on the one or more location identifiers.

In all cases, the one or more location identifiers may include a GSM Cell Global Identity (GSM CGI), an AP Radio Identity (AP-ID), a set of GPS coordinates, or an AP location. In addition, the UNC ARFCN and BSIC values for the MS can be selected by searching an ARFCN and BSIC Lookup Table for the one or more location identifiers for the MS. Note that each of the method described herein can be performed by a computer program embodied on a computer readable medium wherein each step is implemented by one or more code segments.

BRIEF DESCRIPTION OF THE DRAWINGS

Further benefits and advantages of the present invention will become more apparent from the following description of various embodiments that are given by way of example with reference to the accompanying drawings.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a method and system for improved handover of mobile stations (MS) to unlicensed mobile access networks (UMAN) that allows the UMAN operator to define multiple absolute radio frequency channel number (ARFCN) and base station identity code (BSIC) values for one unlicensed network controller (UNC). The MS includes one or more current location identifiers, such as GSM Cell Global Identity (GSM CGI), unlicensed-radio access point (AP) Radio Identity (AP-ID), Global Positioning System (GPS) coordinates or AP location, in the registration request to the UNC. The UNC uses the one or more location identifiers to select different ARFCN and BSIC values for the MS depending on the current MSC Service Area or Location Area or even Cell. As a result, the present invention gives the network operator more flexibility when enabling handover into UMAN in the network. In some cases, handover into UMAN would not be possible without the present invention.

Figure 1:
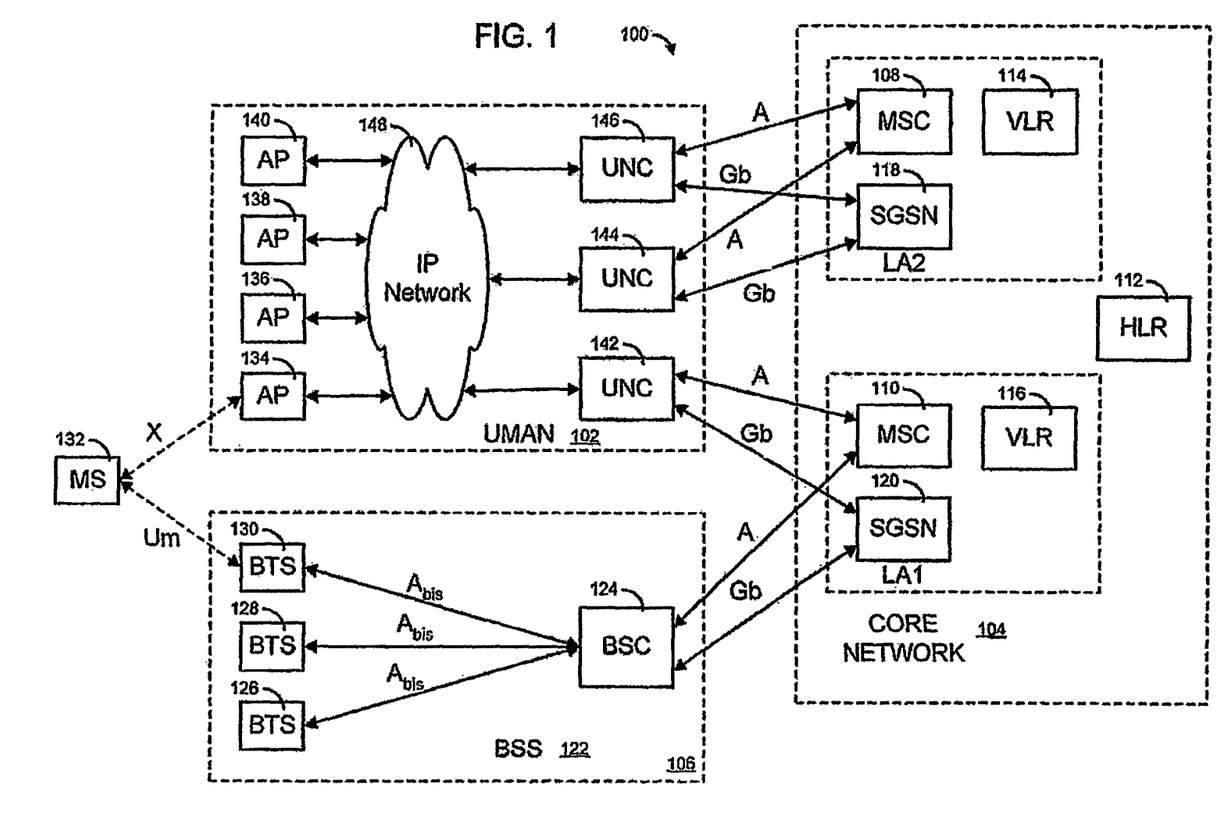
FIG. 1 is a block diagram depicting parts of a GSM network with a UMA network in accordance with the present invention.

Referring now to FIG. 1, a block diagram depicting parts of a GSM network 100 with a UMA network 102, which is one type of access portion 106, in accordance with the present invention is shown. The GSM network 100 is essentially divided into a core network portion 104 and an access portion 106. The elements of the core network 104 include the mobile switching centers (MSC) 108 and 110, associated home location register (HLR) 112 and visitor location registers (VLR) 114 and 116. The function and structure of these conventional GSM architecture elements are known to those in the art and will not be described in further detail here. The core network 104 also supports the General Packet Radio Service (GPRS), and to this end serving GPRS support nodes (SGSN) 118 and 120 are illustrated. Although not illustrated in the figure, it will be understood by those skilled in the art that the core network 104 may include access to other mobile and fixed-line networks, such as ISDN and PSTN networks, packet and circuit switched packet data networks such as intranets, extranets and the Internet through one or more gateway nodes.

The access portion 106 essentially consists of multiple base station subsystems (BSS) 122, only one of which is illustrated. The BSS 122 includes one or more base station controllers (BSC) 124 and one or more base transceiver stations (BTS) 126, 128 and 130. The BSS 122 or BSC 124 communicates via defined fixed standard A and Gb interfaces with MSC 110 and SGSN 120, respectively in the core network portion 104. The BSC 124 communicates with the one or more BTS 126, 128 and 130 via the defined $A_{bis}$ interface. The BTS 130 communicates with mobile stations or terminals (MS or MT 132 over the GSM standard $U_m$ radio air interface. Note that the BSC 124 is often separate from the BTSs 126, 128 and 130 and may even be located at the MSC 110. The physical division depicted in FIG. 1 serves to distinguish between the parts of the network making up the access network portion 106 and those that form the core network portion 104.

In addition to the standard access network portion provided by the BSS 122, the network depicted in FIG. 1 further includes an unlicensed-radio access network (UMAN 102). The components making up this UMAN 102 also enable the MS 132 to access the GSM core network 104, and through this, other communication networks via an unlicensed-radio interface X. A used herein, unlicensed-radio means any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile terminals will be greater. Moreover, because the range is low the unlicensed-radio may be a broadband radio, thus providing improved voice quality. The radio interface may utilize any suitable unlicensed-radio protocol, for example a wireless LAN protocol, Bluetooth radio or Digital Enhanced Cordless Telecommunications (DECT). These radios have higher bandwidth and lower power consumption than conventional public mobile network radio.

These unlicensed-radio standards specify a two-way digital radio link for short-range connections between different devices. Devices are equipped with a transceiver that transmits and receives in one or more frequency bands, such as around 2.45 GHz. The 2.45 GHz band is available globally with some variation of bandwidth depending on the country. Both data and voice channels are available. Each device has a unique 48-bit address from the IEEE 802 standard. Built-in encryption and verification is also available. The element of the UMAN 102 adapted to communicate across the unlicensed-radio interface is designated as an access point (AP) 134, 136, 138 and 140 (also referred to as a local or home base station (HBS)). The AP 134 handles the radio link protocols with MS 132 and contains radio transceivers that define a cell in a similar manner to the operation of a conventional GSM BTS 130. The AP 134 is controlled by a unlicensed network controller (UNC) 142, 144 or 146 (also referred to as a home base station controller (HBSC)), which communicates with MSC 110 over the GSM standard A interface and also with a serving GPRS support node SGSN 120 over a standard Gb interface, if available in the core network 104. The joint function of the AP 134 and the UNC 142 emulates the operation of the BSS 122 towards the SGSN 120 and MSC 110. In other words, when viewed from the elements of the core network 104 such as the MSC 110 and the serving GPRS support node (SGSN) 120, the UMAN 102 constituted by the APs 134, 136, 138 and 140 and the UNC 142 looks like a conventional access network 106.

The interface between the access points 134, etc. and the UNC 142 is preferably provided by a fixed link. The home base station (not shown, but can be integrated in the AP) is intended to be a small device that a subscriber can purchase and install in a desired location such as the home or an office environment to obtain a fixed access to the UMA network. However, they could also be installed by operators in traffic hotspots. In order to reduce the installation costs on the part of the operator, the interface between the home base station (not shown) and the UNC 142 preferably exploits an already existing connection provided by a fixed network 148. Preferably this network 148 is a broadband packet-switched network. Suitable networks might include those based on ADSL, Ethernet, LMDS, or the like. Home connections to such networks are increasingly available to subscribers.

Figure 2:
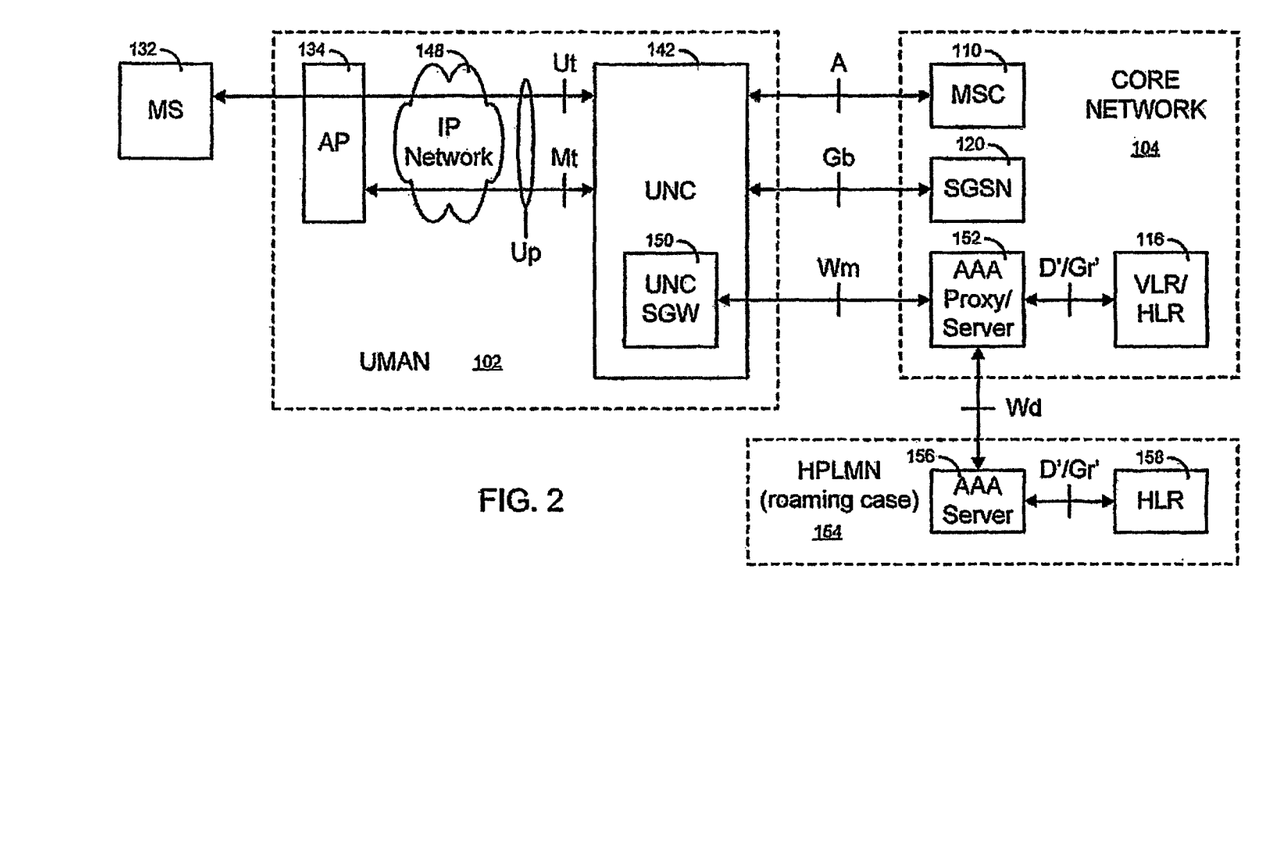
FIG. 2 is a block diagram of the UMA high level functional architecture.

Now referring to FIG. 2, a block diagram of the UMA high level functional architecture is shown. The UMAN 102 includes one or more APs 134 and one or more UNCs 142 (each having a Secure Gateway 150 (UNC SGW)), interconnected through a broadband IP network 148. The UNC SGW 150 terminates secure remote access tunnels from the MS 132 and provides mutual authentication, encryption and data integrity for signaling, voice and data traffic. The UMAN 102 co-exists with the GSM/GPRS radio access network and interconnects to the GSM core network 104 via the same interfaces used by a standard GERAN BSS network element: GSM A-interface for circuit switched services; GPRS Gb-interface for packet services; and Wm-interface or other standard interface for authentication, authorization and accounting. The UNC 142 appears to the GSM/GPRS core network 104 as a GERAN BSS. The principle elements of transaction control (e.g., call processing) and user services are provided by the network elements in the core network 104, namely the MSC 110, SGSN/GGSN 120, Authentication, Authorization and Accounting Proxy/Server 152 (AAA Proxy/Server) and the VLR/HLR 116. The AAA Proxy/Server 152 interfaces with VLR/HLR 116 via D'/Gr' interface. Whenever the MS 132 is roaming, the GSM/GPRS core network 104 will interface with the MS's Home Public Land Mobile Network 154 (HPLMN). Specifically, AAA Proxy/Server 152 will interface with AAA Server 156 via Wd interface. The AAA Server 156 will interface with HLR 158 via D'/Gr' interface.

Broadband IP network 148 provides connectivity between the user premises and the UNC 142. An AP 134 in the user premises provides the radio link to the MS 132 using unlicensed spectrum. The IP transport network extends all the way from the UNC 142 to the MS 132, through an AP 134. A single interface, Ut, is defined between the UNC 142 and the MS 132. The Mt interface is an interface between the UNC 142 and the AP 134. This interface may be used for special functions in some realizations. The Ut and Mt interfaces are collectively referred to as the Up interface.

The MS 132 provides dual mode (licensed and unlicensed) radios and the capability to switch between them. The MS 132 supports an IP interface to the AP 134. In other words, the IP network from the UNC 142 extends all the way to the MS 132. The MS 132 is defined for the applicable unlicensed-radio, such as Bluetooth (using the Bluetooth PAN profile) and 802.11.

The AP 134 provides the radio link towards the MS 132 using unlicensed spectrum and connects through the broadband IP network 148 to the UNC 142. The AP 134 provides the applicable unlicensed radio profile or access point functions, such as Bluetooth (PAN profile) or 802.11 access point functions. The AP 134 may also use other radio access technologies, such as 802.16 or 802.20, etc. Any "standard" AP can be used to interconnect the MS 132 to the broadband EP network 148.

A UNC 142 connects to a unique MSC 110 and SGSN 120 via the A-interface and Gb interface respectively. This does not preclude support of A-flex and Gb-flex features. The UNC 142 provides functions equivalent to that of a GSM/GPRS BSC. The UNC 142 connects via the IP transport network 148 to the AP 134. The UNC 142 interfaces to the MS 132 using the Ut interface and maintains end-to-end communication with the MS 132 and relays GSM/GPRS signaling to the A/Gb interface towards the core network 104. The UNC 142 performs the following functions: transcoding voice to/from the MS 132 to PCM voice when TFO/TrFO features are not being utilized from/to the MSC 110; and the following Ut functionality: registration for UMA service access; set-up of UMA bearer paths for CS and PS services, including participation in establishment, management, and teardown of secure signaling and user plane bearers between the MS 132 and the UNC 142; UMA equivalent functionality for paging and handovers; and transparent transfer of L3 messages between the MS 132 and core network 104.

Figure 3A:
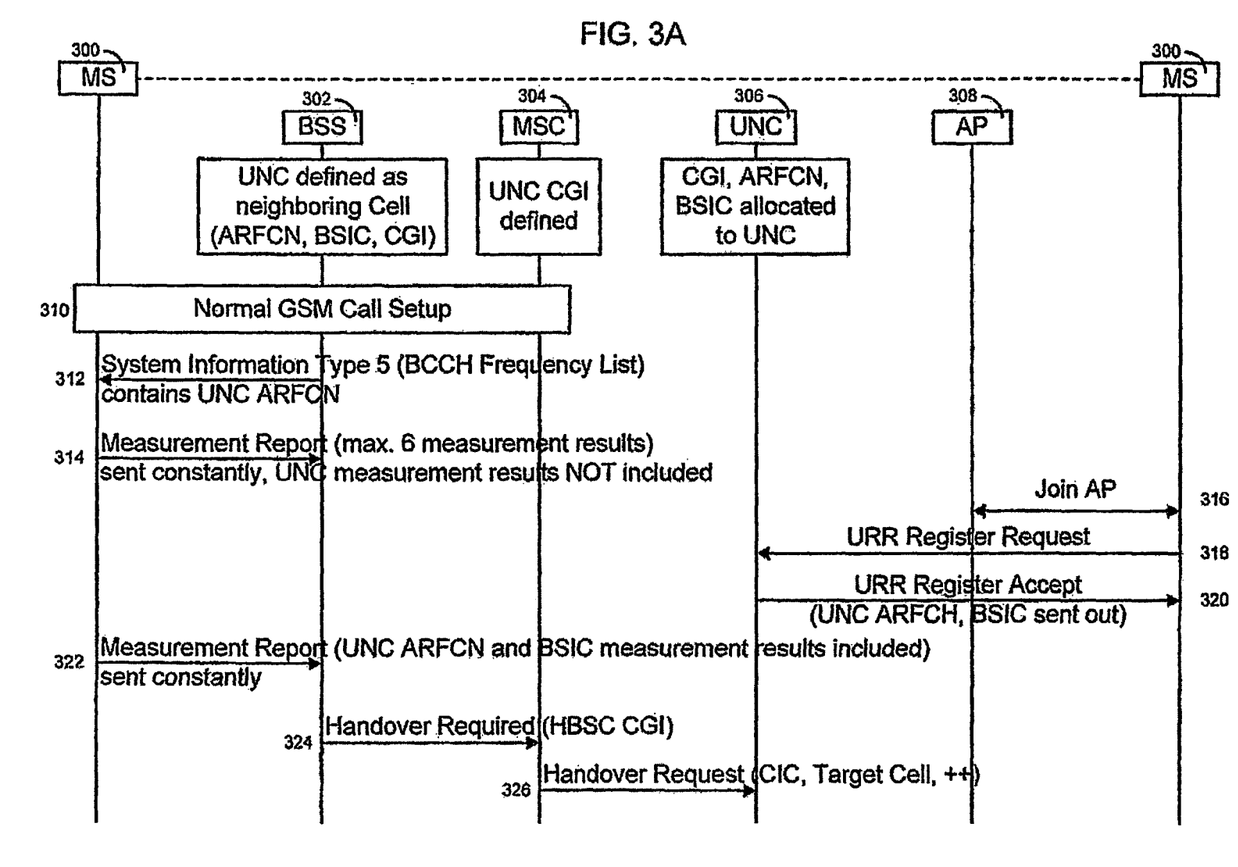
FIGS. 3A and 3B depict representative signaling sequences for the handover of a MS into UMAN.
Figure 3B:
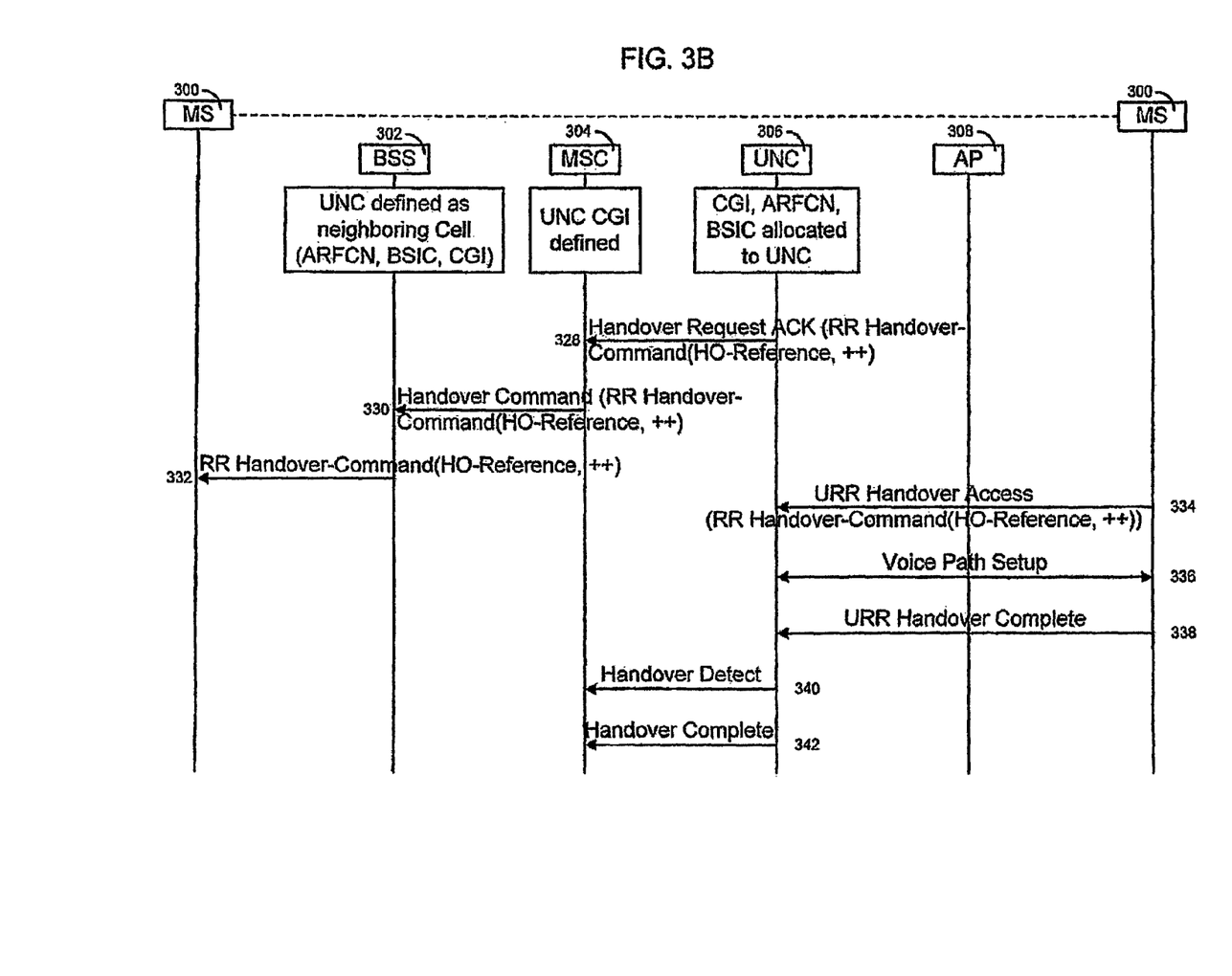

Referring now to FIGS. 3A and 3B, representative signaling sequences for the handover of a MS 300 into UMAN are shown. Handover into UMAN is defined in the Unlicensed Mobile Access (UMA) specifications as follows:

1. MS 300 has detected UMA coverage and successfully registered on the UMAN, allowing the MS to obtain system information relating to the UMAN cell. The Absolute Radio Frequency Channel Number (ARFCN) and Base Station Identity Code (BSIC) values defined for the UNC 306 are included in this system information if the UMAN operator allows handover into UMAN.
2. Further, the GERAN provides information on the neighboring cells such that one of the ARFCN in the neighbor list matches the ARFCN associated with the UMAN cell.

Although the whole message sequence for handover to UMAN (from GERAN) is shown in FIGS. 3A and 3B (ignoring UNC 306 discovery, redirection and registration), a detailed explanation is not necessary to understand how the present invention can be incorporated into current handover procedures.

The MS 300 establishes a call via the GERAN macro network using normal GSM call setup procedures 310 with BSS 302 and MSC 304. The BSS 302 defines the UNC 306 as a neighboring Cell having ARFCN, BSIC and CGI values. Similarly, the MSC 304 defines the CGI value for the UNC 306. As a result, the UNC 306 is allocated CGI, ARFCN and BSIC values. After call setup 310, BSS 302 sends System Information 312 Type 5 containing a BCCH Frequency List and the ARFCN for UNC 306 to MS 300. MS 300 sends a Measurement Report 314 containing a maximum of six measurement results to BSS 302. These results are sent constantly and do not include measurement results for UNC 306.

When the call is still established, the MS 300 joins a AP 308 (WLAN or Bluetooth) using process 316. MS 300 initiates registration towards UNC 306 by sending a URR Register Request message 318 to UNC 306, which responds to the MS 300 by sending a URR Register Accept message 320 to MS 300 that contains the ARFCN and BSIC values allocated for the UNC 306.

MS 300 then starts including the UNC ARFCN and BSIC values in the Measurement Reports 322 that are constantly sent to BSS 302. Eventually, BSS 302 triggers handover (to UMAN) by sending a Handover Required message 324 containing HBSC CGI to MSC 304, which sends a Handover Request message 326 containing CIC, Target Cell and other information elements or parameters to UNC 306. These other information elements or parameters (hereinafter referred to as "++") are defined in the relevant 3GPP specifications. UNC 306 responds by sending a Handover Request Acknowledgment message 328 containing RR Handover-Command (HO-Reference, ++) to MSC 304, which in turn sends a Handover Command message 330 containing RR Handover-Command (HO-Reference, ++) to BSS 302, which in turn sends a RR Handover-Command (HO-Reference, ++) message 332 to MS 300.

MS 300 sends URR Handover Access (RR Handover-Command (HO-Reference, ++)) message 334 to UNC 306. Thereafter, MS 300 and UNC 306 perform Voice Path Setup procedures 336. MS 300 then sends a URR Handover Complete message 338 to UNC 306, which sends a Handover Detect message 340 and Handover Complete message 342 to MSC 304. Additional details regarding these procedures can be found in the applicable 3GPP and UMA specifications.

The MS 300 sends the following information to the UNC 306 during registration:

International Mobile Subscriber Identity (IMSI)—Mobile Identity consisting of MCC, MNC and MSIN. MCC and MNC define a PLMN.

GSM Cell Global Identity (GSM CGI)—consisting of Location Area Identification (LAI), which also contains MCC, MNC and LAC, and Cell Identity (CI), which identifies a specific Cell inside one Location area.

AP Radio Identity (AP-ID)—The Radio MAC-address of the AP 308 identifying each AP. The MS 300 reports the AP-ID and UNC 306 can make a database lookup to find the location (longitude, latitude) of the AP. Location of the MS 300 is close enough to the Location of the AP 308.

GPS coordinates (optional)—The location (longitude, latitude, height) of the MS 300 is reported to the UNC 306.

AP location—AP Location is reported by the MS 300 (e.g., in the format of a street address). UNC 306 can make a database lookup to find the location (longitude, latitude) of the AP 308. Location of the MS 300 is close enough to the Location of the AP 308.

The GSM CGI, AP-ID, GPS Coordinates and/or AP Location are all location identifiers that can be used by the present invention to find out the location of the MS 300. The present invention includes one or more of these location identifiers in the URR Register Request message 318 sent by MS 300 to UNC 306. UNC 306 uses the one or more location identifiers to select proper ARFCN and BSIC values to the MS 300. This selection can be performed by searching a Lookup Table accessed by UNC 306 that correlates one or more of the location identifiers to an allocated ARFCN and BSIC value. The selected ARFCN and BSIC values are sent to MS 300 by UNC 306 in URR Register Accept message 320.

Figure 4:
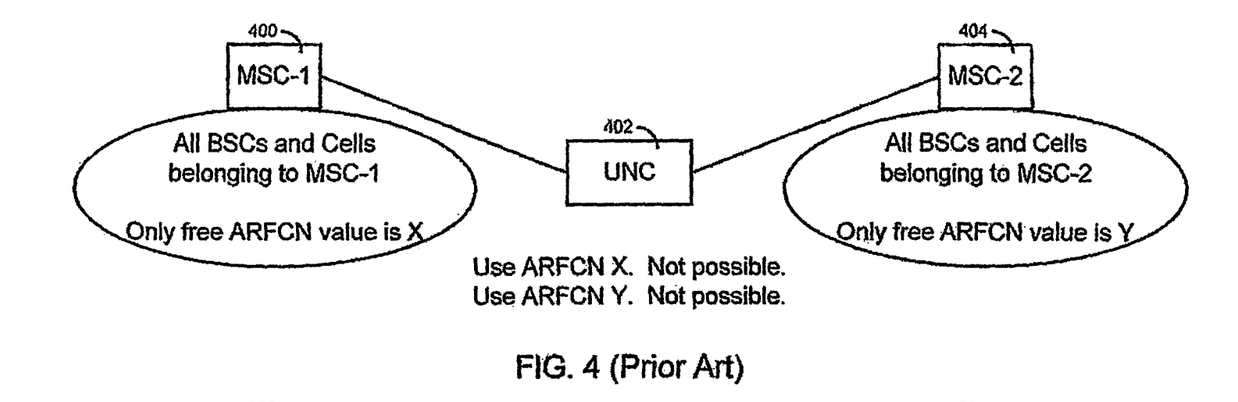
FIG. 4 is a logical diagram illustrating a scenario in which the handover of a MS is not possible into UMAN in accordance with the prior art.
Figure 5:
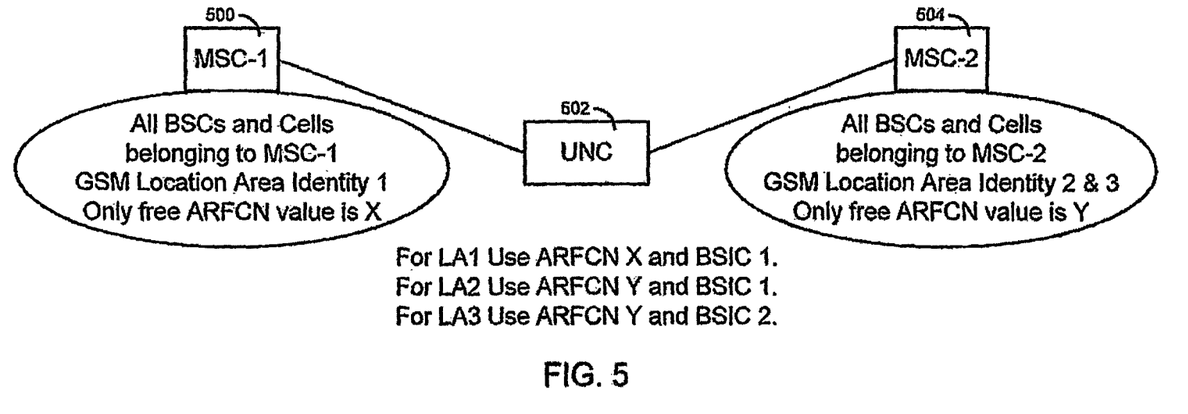
FIG. 5 is a logical diagram illustrating the scenario of FIG. 4 in which the handover of a MS is possible into UMAN in accordance with the present invention.

Now referring to FIG. 5 and in contrast to FIG. 4, a logical diagram illustrating the scenario of FIG. 4 in which the handover of a MS is possible into UMAN in accordance with the present invention is shown. In this example, one UNC 502 is serving multiple MSC Serving Areas and the same ARFCN value cannot be used in the BSC's and cells belonging to these MSC Service Areas. More specifically, MSC-1 500 and MSC-2 504 are both connected to UNC 502. MSC-1 500 corresponds to GSM LAI 1 and only has one free ARFCN value X available in the Cells belonging to MSC-1 500. Similarly, MSC-2 504 corresponds to GSM LAI 2 and 3, and only has one free ARFCN value Y available in the Cells belonging to MSC-2 504. As a result, UNC 502 indicates different ARFCN and BSIC values to MSs registering from Service Areas covered by MSC-1 500 and MSC-2 504. ARFCN X and BSIC 1 are used for LA1, ARFCN Y and BSIC 1 are used for LA2, and ARFCN Y and BSIC 2 are used for LA3. Accordingly, handover of the MS to the UNC 502 is possible in this scenario.

Figure 6A:
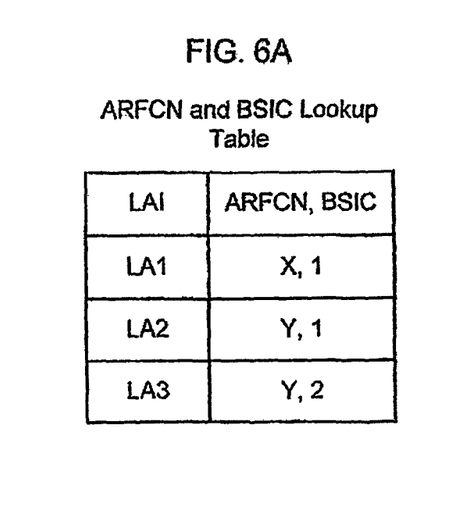
FIG. 6A is an example of an ARFCN and BSIC Lookup Table in accordance with the present invention.

Referring now to FIG. 6A, an example of an ARFCN and BSIC Lookup Table in accordance with the present invention is shown. The location identifier GSM CGI is used in this example to illustrate the principles of the present invention. The ARFCN and BSIC Lookup Table is built using the Location Area Identity (registered by the MS in Registration to the UNC). This table could as well be built using the whole CGI or even the location (longitude, latitude, height) of the MS. Moreover, one or more of the other location identifiers may also be used either alone or in combination with the GSM CGI. The ARFCN and BSIC Lookup Table shown in FIG. 6A allocates the ARFCN and BSIC values to specific LAIs: ARFCN is X and BSIC is 1 for LA1; ARFCN is Y and BSIC is 1 for LA2; and ARFCN is Y and BSIC is 2 for LA1. The UMAN operator defines the ARFCN and BSIC Lookup Table in the UNC.

Figure 6B:
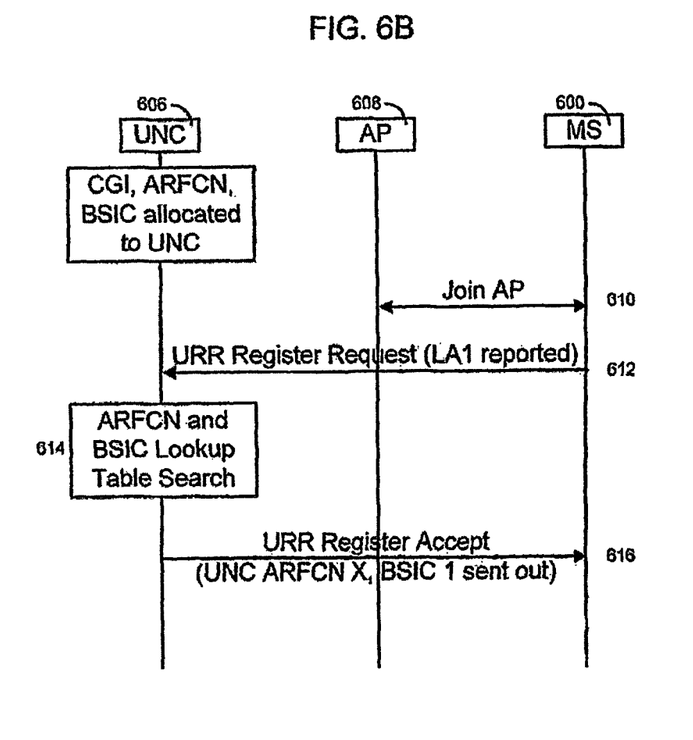
FIG. 6B depicts an example of representative signaling sequences using the Lookup Table of FIG. 6A in accordance with the present invention.

Now referring to FIG. 6B, an example of representative signaling sequences using the Lookup Table of FIG. 6A in accordance with the present invention is shown. Once a MS 600 has joined AP 608 using standard procedures and when MS 600 is located by the MSC, it will include the current GSM Location Area identity (as part of the GSM CGI) in the URR Registration Request message 612 sent to the UNC 606. UNC 606 searches the ARFCN and BSIC Lookup Table (as shown in FIG. 6A) and selects the ARFCN value X and BSIC value 1 that correspond to the GSM CGI location identifier of LA1 provided by MS 600. UNC 606 sends the ARFCN value X and BSIC value 1 to MS 600 in the URR Register Accept message 616. Likewise, MS's registering from a Location Area belonging to another MSC would in the same way include LA2 or LA3 in the registration request. As a result, the UNC would return the ARFCN value Y and BSIC value 1 or ARFCN value Y and BSIC value 2, respectively, to the MS.

Figure 7A:
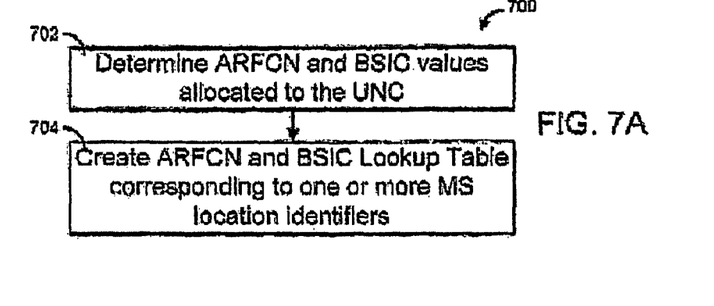
FIGS. 7A, 7B and 7C are flow charts depicting the creation of an ARFCN and BSIC Lookup Table, the operation of a MS, and the operation of a UNC, respectively, in accordance with the present invention.
Figure 7B:
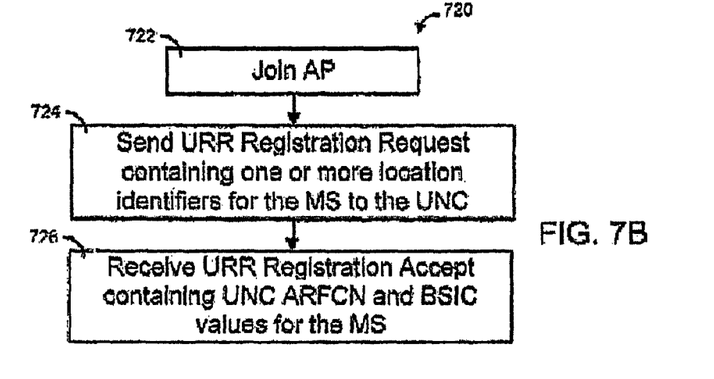
Figure 7C:
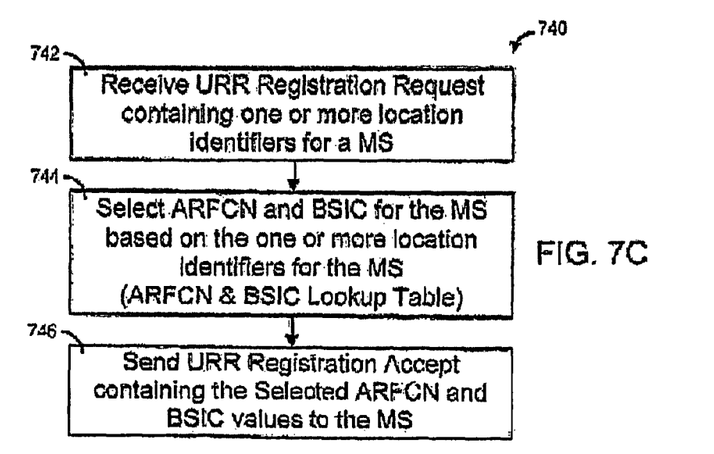

Referring now to FIGS. 7A, 7B and 7C, flow charts depicting the creation of an ARFCN and BSIC Lookup Table, the operation of a MS, and the operation of a UNC, respectively, in accordance with the present invention are shown. The creation 700 of an ARFCN and BSIC Lookup Table (FIG. 7A) is performed by determining the ARFCN and BSIC values allocated to the UNC in block 702 and creating the ARFCN and BSIC Lookup Table corresponding to the one or more MS location identifiers in block 704. The operation 720 of the MS (FIG. 7B) includes joining the AP in block 722, sending a URR Registration Request message containing one or more location identifiers for the MS to the UNC in block 724, and receiving a URR Registration Accept message containing UNC ARFCN and BSIC values for the MS in block 726. The operation 740 of the UNC (FIG. 7C) includes receiving a URR Registration Request message containing one or more location identifiers for a MS in block 742, selecting UNC ARFCN and BSIC values for the MS based on the one or more location identifiers for the MS (typically by searching an ARFCN and BSIC Lookup Table) in block 744, and sending a URR Registration Accept message containing the selected ARFCN and BSIC values for the MS in block 746. The methods illustrated in FIGS. 7A, 7B and 7C can be performed by a computer program embodied on a computer readable medium wherein each step is implemented by one or more code segments.

Note that FIGS. 7B and 7C can be combined provide method for handover of MS to UNC by sending a URR Registration Request message containing one or more location identifiers for the MS to the UNC in block 724, selecting UNC ARFCN and BSIC values for the MS based on the one or more location identifiers for the MS in block 744, and sending a URR Registration Accept message containing the selected ARFCN and BSIC values for the MS to the MS in block 746. The one or more location identifiers may include a GSM CGI, an AP-ID, a set of GPS coordinates, or an AP location. The UNC ARFCN and BSIC values for the MS are selected by searching an ARFCN and BSIC Lookup Table for the one or more location identifiers for the MS. This combined method can be performed by a computer program embodied on a computer readable medium wherein each step is implemented by one or more code segments.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification, but only by the claims.

The invention claimed is:

1. A method of handing over a mobile station (MS) to an unlicensed mobile access (UMA) network controller (UNC) in an unlicensed mobile access network (UMAN), the method comprising the steps of:
   allocating a plurality of absolute radio frequency channel number (ARFCN) and base station identity code (BSIC) values to one UNC;
   sending a UMA radio resource (URR) Registration Request message from the MS to the UNC, said URR Registration Request message containing one or more location identifiers for the MS;
   selecting ARFCN and BSIC values for the MS from the plurality of ARFCN and BSIC values allocated to the UNC based on the one or more location identifiers for the MS; and
   sending a URR Registration Accept message from the UNC to the MS, said URR Registration Accept message containing the selected ARFCN and BSIC values.

2. The method as recited in claim 1, wherein the one or more location identifiers are selected from a group consisting of a GSM Cell Global Identity (GSM CGI), an Access Point Radio Identity (AP-ID), a set of GPS coordinates, and an AP location.

3. The method as recited in claim 1, wherein the step of selecting the ARFCN and BSIC values includes searching an ARFCN and BSIC Lookup Table for the one or more location identifiers for the MS.

4. The method as recited in claim 1, further comprising the step of joining an AP associated with the UNC.

5. A method of determining an absolute radio frequency channel number (ARFCN) and a base station identity code (BSIC) for use by an unlicensed mobile access network controller (UNC) to handover a mobile station (MS) in an unlicensed mobile access network (UMAN), the method comprising the steps of:
   creating an ARFCN and BSIC lookup table that correlates one or more location identifiers for the MS to a plurality of ARFCN and BSIC allocated to the UNC;
   determining a current location identifier for the MS; and
   determining the ARFCN and BSIC by utilizing the current location identifier for the MS as an input parameter in the ARFCN and BSIC lookup table.

6. The method as recited in claim 5, wherein the one or more location identifiers are selected from a group consisting of a GSM Cell Global Identity (GSM CGI), an Access Point Radio Identity (AP-ID), a set of GPS coordinates, or an AP location.

7. A method of handing over a mobile station (MS) to an unlicensed mobile access network controller (UNC) in an unlicensed mobile access network (UMAN), the method comprising the steps of:
   receiving by the UNC from the MS, a UMA radio resource (URR) Registration Request message, said URR Registration Request message containing one or more location identifiers for the MS;
   selecting by the UNC, absolute radio frequency channel number (ARFCN) values and base station identity code (BSIC) values from a plurality of ARFCN and BSIC values allocated to the UNC for the MS based on the one or more location identifiers for the MS; and
   sending a URR Registration Accept message to the MS, said URR Registration Accept message containing the selected ARFCN and BSIC values.

8. The method as recited in claim 7, wherein the one or more location identifiers are selected from a group consisting of a GSM Cell Global Identity (GSM CGI), an Access Point Radio Identity (AP-ID), a set of GPS coordinates, and an AP location.

9. The method as recited in claim 7, wherein the step of selecting the ARFCN and BSIC values includes searching an ARFCN and BSIC Lookup Table for the one or more location identifiers for the MS.

10. A computer program embodied on a non-transitory computer readable medium to handover a mobile station (MS) to an unlicensed mobile access network controller (UNC) in an unlicensed mobile access network (UMAN), the computer program comprising:
   a code segment for receiving from the MS, a UMA radio resource (URR) Registration Request message, said URR Registration Request message containing one or more location identifiers for the MS;
   a code segment for selecting for the MS, absolute radio frequency channel numbers (ARFCN) and base station identity code (BSIC) values from a plurality of ARFCN and BSIC values allocated to the UNC based on the one or more location identifiers for the MS; and
   a code segment for sending a URR Registration Accept message to the MS, said URR Registration Accept message containing the selected ARFCN and BSIC values.

11. A system in an unlicensed mobile access network (UMAN) comprising:
   a mobile station (MS) having one or more location identifiers;
   an unlicensed mobile access network controller (UNC) in communication with the MS; and
   a lookup table accessible by the UNC, the lookup table associating MS location identifiers with a plurality of absolute radio frequency channel number (ARFCN) values and base station identity code (BSIC) values allocated to the UNC, wherein the UNC is adapted to select from the lookup table, ARFCN and BSIC values allocated to the UNC for the MS based on the one or more location identifiers of the MS.

12. The system as recited in claim 11, wherein the one or more location identifiers are selected from a group consisting of a GSM Cell Global Identity (GSM CGI), an Access Point Radio Identity (AP-ID), a set of GPS coordinates, and an AP location.

* * * * *

UNITED STATES PATENT AND TRADEMARK OFFICE
CERTIFICATE OF CORRECTION

PATENT NO.           : 8,526,958 B2                                   Page 1 of 1
APPLICATION NO.      : 11/721063
DATED                : September 3, 2013
INVENTOR(S)          : Niska et al.

It is certified that error appears in the above-identified patent and that said Letters Patent is hereby corrected as shown below:

In the Specification

In Column 7, Line 20, delete "EP" and insert -- IP --, therefor.

Signed and Sealed this
Twenty-fourth Day of December, 2013

Margaret A. Focarino
*Commissioner for Patents of the United States Patent and Trademark Office*